US010516720B2

(12) United States Patent
Lu

(10) Patent No.: US 10,516,720 B2
(45) Date of Patent: Dec. 24, 2019

(54) METHOD AND SYSTEM FOR TRANSMITTING BROWSER WEB PAGE INFORMATION

(71) Applicant: TENCENT TECHNOLOGY (SHENZHEN) COMPANY LIMITED, Shenzhen, Guangdong (CN)

(72) Inventor: Yisha Lu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 147 days.

(21) Appl. No.: 15/193,599

(22) Filed: Jun. 27, 2016

(65) Prior Publication Data

US 2016/0308939 A1 Oct. 20, 2016

Related U.S. Application Data

(63) Continuation of application No. PCT/CN2015/072844, filed on Feb. 12, 2015.

(30) Foreign Application Priority Data

Feb. 24, 2014 (CN) .......................... 2014 1 0062285

(51) Int. Cl.
*G06F 15/16* (2006.01)
*H04L 29/08* (2006.01)
(Continued)

(52) U.S. Cl.
CPC .......... *H04L 67/025* (2013.01); *H04L 51/043* (2013.01); *H04L 51/046* (2013.01);
(Continued)

(58) Field of Classification Search
CPC ...................................................... H04L 67/02
(Continued)

(56) References Cited

U.S. PATENT DOCUMENTS 6,950,852 B1 * 9/2005 Kobayaghi ............. H04L 29/06 709/204
2002/0032731 A1 * 3/2002 Qian ................ G06F 17/30873 709/204
(Continued)

FOREIGN PATENT DOCUMENTS

CN 101415010 A 4/2009
CN 102891897 A 1/2013
(Continued)

OTHER PUBLICATIONS

International Preliminary Report for App. No. PCT/CN2015/072844 dated Aug. 30, 2016.
(Continued)

*Primary Examiner* — Hamza N Algibhah
(74) *Attorney, Agent, or Firm* — Brinks Gilson & Lione

(57) ABSTRACT

A method and a system for transmitting browser web page information includes receiving, by a web server, a web page transmission request from a sending party browser. The web page transmission request includes a receiving party account and a link address. The link address is a website address of a web page currently displayed by the sending party browser. The method includes determining, by the web server, that a receiving party has logged in by using (1) the receiving party account and (2) a browser provided with an inter-screen transmission entrance and is online. The method includes sending, by the web server, the link address to a receiving party browser corresponding to the receiving party account for web page access.

12 Claims, 6 Drawing Sheets

(51) Int. Cl.
*H04L 29/06* (2006.01)
*H04L 12/58* (2006.01)

(52) U.S. Cl.
CPC .............. *H04L 51/32* (2013.01); *H04L 67/22* (2013.01); *H04L 67/24* (2013.01); *H04L 67/42* (2013.01)

(58) Field of Classification Search
USPC .......................................................... 709/206
See application file for complete search history.

(56) References Cited

U.S. PATENT DOCUMENTS

2002/0073152 A1* 6/2002 Andrew ............ G06F 17/30873 709/204
2003/0195963 A1 10/2003 Song et al.
2003/0225836 A1* 12/2003 Lee ....................... H04M 3/567 709/205
2008/0208963 A1 8/2008 Eyal et al.
2009/0119363 A1* 5/2009 Suzuki .............. G06F 17/30876 709/203
2009/0228504 A1* 9/2009 Brown .............. G06F 17/30884
2009/0292618 A1* 11/2009 Chatila .............. G06Q 30/0601 705/26.1
2010/0250755 A1* 9/2010 Morris .............. G06F 17/30899 709/228
2010/0250756 A1* 9/2010 Morris .............. G06F 17/30899 709/228
2011/0113364 A1* 5/2011 Neil ...................... G06F 3/0482 715/802
2011/0289156 A1* 11/2011 Pirnazar ............ G06F 17/30873 709/206
2011/0289157 A1* 11/2011 Pirnazar ............ G06F 17/30873 709/206
2012/0271819 A1* 10/2012 Qiu ........................ G06Q 30/02 707/723
2014/0164934 A1* 6/2014 Yang ................... G06F 17/3089 715/738
2014/0214919 A1* 7/2014 Taylor ................. H04L 67/2814 709/203
2015/0039982 A1* 2/2015 Bastide ............. G06F 17/30864 715/205
2017/0118258 A1* 4/2017 Lieb ...................... H04L 65/403

FOREIGN PATENT DOCUMENTS

CN 103001856 A 3/2013
CN 103167014 A 6/2013
CN 103248665 A 8/2013

OTHER PUBLICATIONS

International Search Report for App. No. PCT/CN2015/072844 dated May 12, 2015.
Chinese Office Action for Application No. 2014100622851 dated Jul. 19, 2017, and an English concise explanation of relevance thereof.
Second Chinese Office Action of Application No. 201410062285.1 dated Mar. 5, 2018 (8 pages) with an English concise explanation of relevance thereof (1 page).

* cited by examiner

METHOD AND SYSTEM FOR TRANSMITTING BROWSER WEB PAGE INFORMATION

CROSS-REFERENCE TO RELATED APPLICATIONS

This application is a continuation of International Application No. PCT/CN2015/072844, filed on Feb. 12, 2015. This application claims the benefit and priority of Chinese Application No. 201410062285.1, filed on Feb. 24, 2014. The entire disclosures of each of the above applications are incorporated herein by reference.

FIELD

The present disclosure relates to web page information processing technologies and a system for transmitting browser web page information.

BACKGROUND

This section provides background information related to the present disclosure which is not necessarily prior art.

As the frequent use of browsers is increasing, functions of the browsers are continuously improving. Currently, an inter-screen transmission method for transmitting web page information by using a browser is available. By using an inter-screen transmission function, a currently browsed web page can be sent with one click on an inter-screen transmission entrance button on the browser to a browser of another device. Currently, the inter-screen transmission function is mainly implemented in the following three steps, which are separately described herein.

When needing to share a currently browsed web page, a user copies a website address on a browser, logs in to a social network, selects a friend, and sends the website address after pasting the copied website address. When logging into the social network, such as Renren or Pengyou, the friend can receive the shared web page information. However, all the existing methods for transmitting browser web page information have a defect that web page information cannot be conveniently transmitted in time.

SUMMARY

This section provides a general summary of the disclosure, and is not a comprehensive disclosure of its full scope or all of its features.

An exemplary method for transmitting browser web page information includes the following:

receiving, by a web server, a web page transmission request from a sending party browser, the web page transmission request including a receiving party account and a link address, and the link address being a website address of a web page currently displayed by the sending party browser;

determining, by the web server, that a receiving party logs in by using the receiving party account and a browser provided with an inter-screen transmission entrance, and is online; and sending, by the web server, the link address to a receiving party browser corresponding to the receiving party account for web page access.

An exemplary web server for transmitting browser web page information includes a request acquisition unit, a login state determining unit, and a web page information transmission unit;

the request acquisition unit receiving a web page transmission request from a sending party browser, the web page transmission request including a receiving party account and a link address, and the link address being a website address of a web page currently displayed by a sending party browser;

the login state determining unit receiving the web page transmission request from the request acquisition unit, determining that a receiving party logs in by using the receiving party account and a browser provided with an inter-screen transmission entrance, and is online, and sending the web page transmission request to the web page information transmission unit; and the web page information transmission unit receiving the web page transmission request from the login state determining unit, and sending the link address to a receiving party browser corresponding to the receiving party account for web page access.

An exemplary browser for transmitting browser web page information includes a user operation capturing unit and a transmission request initiating unit;

the user operation capturing unit acquiring a web page transmission request that is input by a user by operating a web page transmission option of an inter-screen transmission entrance, and sending the web page transmission request to the transmission request initiating unit, the web page transmission request including a receiving party account and a link address, and the link address being a website address of a web page currently displayed by a sending party browser; and the transmission request initiating unit receiving the web page transmission request from the user operation capturing unit, and sending the web page transmission request to the transmission request acquisition unit.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 2 is a diagram of a browser interface for transmitting browser web page information according to various embodiments;

Corresponding reference numerals indicate corresponding parts throughout the several views of the drawings.

DETAILED DESCRIPTION

Example embodiments will now be described more fully with reference to the accompanying drawings.

To make the goals, technical methods, and benefits of the present disclosure clearer, the present disclosure is further described in detail below with reference to embodiments and the accompanying drawings.

Figure 1:
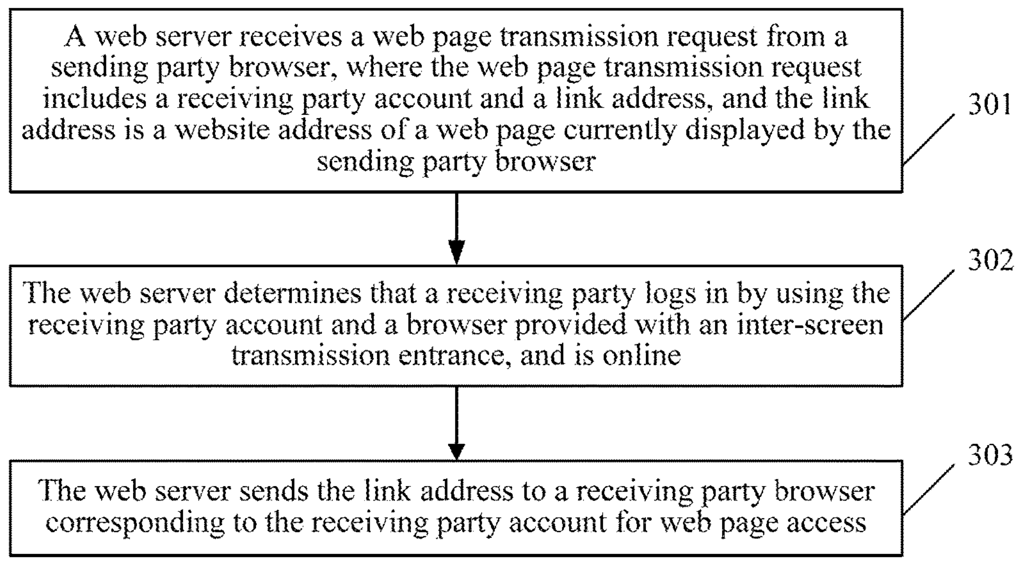
FIG. 1 is a flowchart of a method for transmitting browser web page information according to various embodiments of the present disclosure.

In the present disclosure, a sending party browser sends, to a web server, a web page transmission request used for sharing a web page, and the web server receives the web page transmission request. After processing the web page transmission request, the web server sends a link address included in the web page transmission request to a receiving party browser that is online and is provided with an inter-screen transmission entrance. A receiving party does not need to open and login to a social network to view web page information, and can receive the web page information from the sending party browser as long as the receiving party logs in by using a browser provided with an inter-screen transmission function. Therefore, the web page information is transmitted in a more timely and convenient manner. FIG. 1 is a flowchart of a method for transmitting browser web page information according to the present disclosure. The method includes the following blocks.

Block S301: A web server receives a web page transmission request from a sending party browser, where the web page transmission request includes a receiving party account and a link address, and the link address is a website address of a web page currently displayed by the sending party browser. Web page information is both sent and received by browsers, and the browsers are browsers provided with an inter-screen transmission entrance. Correspondingly, all requests related to web page information transmission are processed by the web server, and the web server may process a request related to a function of the browsers. By clicking an inter-screen transmission entrance set on a browser, a corresponding option may further be selected as needed for a subsequent operation, for example, a web page transmission option may be selected, and a web page currently displayed by the browser is shared with a receiving party.

Block S302: The web server determines that a receiving party logs in by using the receiving party account and a browser provided with an inter-screen transmission entrance, and is online. If a user logs in to a browser by using an account, a web server has a corresponding record, where the record further includes a type of the browser, that is, whether the user logs in by using a browser provided with an inter-screen transmission entrance. After the receiving party account is learned, it can be determined, according to the record, whether the receiving party logs in by using a browser provided with an inter-screen transmission entrance. If the receiving party logs in by using a browser provided with an inter-screen transmission entrance, it is determined that the receiving party is online, and block S303 is performed next. If the receiving party does not log in by using a browser provided with an inter-screen transmission entrance, or if the receiving party is offline, block S303 is not performed, or may also be performed after the receiving party logs in.

Block S303: The web server sends the link address to a receiving party browser corresponding to the receiving party account for web page access. The receiving party browser may directly access the link address, and may also determine, according to a selection of a user, whether to access the link address as follows:

the web server sends web page sharing information including the link address to the receiving party browser; and the receiving party browser displays the web page sharing information to prompt the user whether to choose to share the web page or ignore sharing, and accesses the corresponding web page by using the link address if the user chooses to share the web page, or ends the display of the web page sharing information if the user chooses to ignore sharing.

After an inter-screen transmission entrance set on a browser is clicked, a corresponding option is selected as needed for a subsequent operation, for example, a web page transmission option, a friend list display option, an online-friend list display option, an invitation option, or the like. Descriptions of the options are provided below.

By using the friend list display option, all friends with whom a friendship has been established with can be displayed, namely, all online and offline friends as follows:

the receiving party browser receives a friend list display request that is input by the user by operating the friend list display option, and sends the friend list display request including a sending party account to the web server;

the web server extracts a friend list corresponding to the sending party account, and feeds back the friend list to the sending party browser; and the sending party browser displays the friend list in an interface.

A new friend may be added to the friend list by using a friend adding option. The friend list includes accounts of all friends, and may further include a friend associated account corresponding to each friend account, where the friend associated account is, for example, a mobile number or a social network account of a friend, where the social network account is, for example, a Renren account, a microblog account, or a Pengyou account.

By using the online-friend list display option, a currently online friend in a friend list can be displayed as follows:

the receiving party browser receives an online-friend list display request that is input by the user by operating the online-friend list display option, and sends the online-friend list display request including a sending party account to the web server;

the web server extracts a friend list corresponding to the sending party account;

the web server selects, from the friend list, an online friend logging in by using a browser provided with an inter-screen transmission entrance, to generate an online-friend list, and feeds back the online-friend list to the sending party browser; and the sending party browser displays the online-friend list in an interface.

The online-friend list includes accounts of online friends, and may further include a friend associated account corresponding to each online-friend account, where the friend associated account is, for example, a mobile number or a social network account of a friend, where the social network account is, for example, a Renren account, a microblog account, or a Pengyou account.

By using the web page transmission option, the web page currently displayed by the browser can be shared with the receiving party. The receiving party account may be selected from the friend list or the online-friend list, or may be input directly, then a “confirm” button is clicked, and the sending party browser sends a web page transmission request including the receiving party account and the link address to the web server.

By using the invitation option, an invitation may be initiated to an offline friend or a friend who has not used a browser with an inter-screen transmission function, to invite the friend to use a browser with an inter-screen transmission function as well. Web page information can be rapidly shared as follows:

the sending party browser receives an invitation request that is input by the user by operating the invitation option, where the invitation request includes the sending party account and a friend associated account, and sends the invitation request to the web server;

the web server sends the invitation request to a network service server corresponding to the friend associated account; and the network service server sends invitation information including the sending party account to a client corresponding to the friend associated account for display.

The friend associated account included in the invitation request may be input directly; and it is also feasible to determine an offline friend by comparing the online-friend list and the friend list and select an associated account of the offline friend for input.

The invitation request may be actively triggered by the sending party. For example, the sending party learns that the online-friend list does not have a corresponding friend, and actively initiates an invitation. In various embodiments at block S302 of the process in FIG. 1, if it is determined that the receiving party is offline, the web server may feed back an offline prompt to the sending party browser, and the sending party may then choose to initiate the invitation request to the receiving party.

In the present disclosure, a web server receives a web page transmission request sent by a sending party browser, where the web page transmission request includes a receiving party account and a link address. The web server determines that a receiving party logs in by using the receiving party account and a browser provided with an inter-screen transmission entrance, and is online. The web server sends the link address to a receiving party browser corresponding to the receiving party account for web page access. The sending party browser sends the web page transmission request to the web server, and the web server sends the link address to the receiving party browser that is online and is also provided with an inter-screen transmission entrance. The receiving party does not need to open and login to a social network to view web page information, and can receive the web page information from the sending party browser as long as the receiving party logs in by using a browser provided with an inter-screen transmission function. Therefore, the web page information is received in a more timely and convenient manner.

Figure 2:
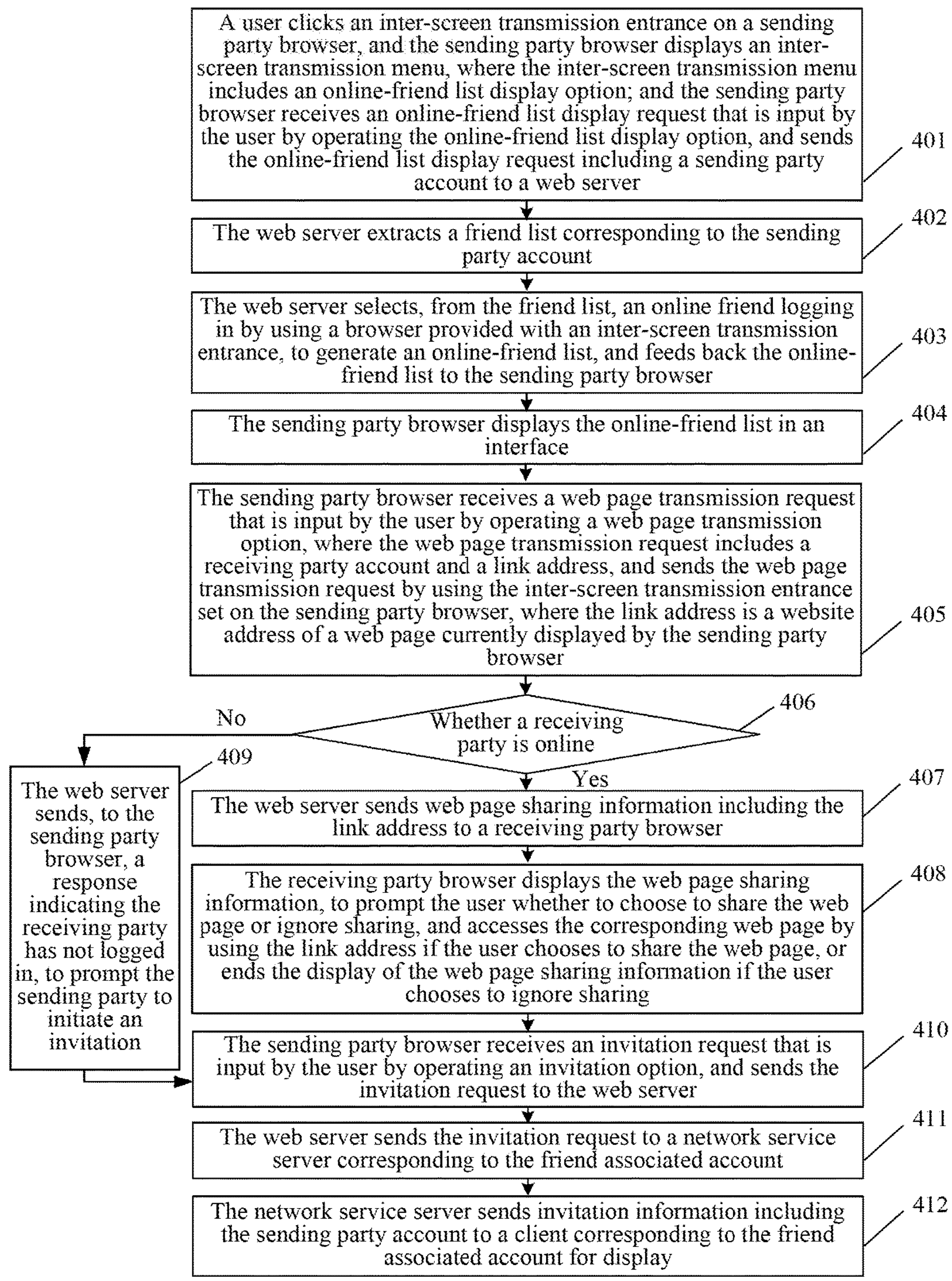
FIG. 2 is a flowchart of an example of a method for transmitting browser web page information according to various embodiments.

FIG. 2 depicts a method for transmitting browser web page information and is described below by using an example, which includes the following blocks.

Block S401: A user clicks an inter-screen transmission entrance on a sending party browser, and the sending party browser displays an inter-screen transmission menu, where the inter-screen transmission menu includes an online-friend list display option. The sending party browser receives an online-friend list display request that is input by the user by operating the online-friend list display option, and sends the online-friend list display request including a sending party account to a web server.

Block S402: The web server extracts a friend list corresponding to the sending party account.

Block S403: The web server selects, from the friend list, an online friend logging in by using a browser provided with an inter-screen transmission entrance, to generate an online-friend list, and feeds back the online-friend list to the sending party browser.

Block S404: The sending party browser displays the online-friend list in an interface. An inter-screen transmission interface shown in FIG. 3 includes the acquired online-friend list, where the online-friend list further shows associated devices of friends.

Block S405: The sending party browser receives a web page transmission request that is input by the user by operating a web page transmission option, where the web page transmission request includes a receiving party account and a link address, and sends the web page transmission request by using the inter-screen transmission entrance set on the sending party browser, where the link address is a website address of a web page currently displayed by the sending party browser.

Block S406: The web server determines whether a receiving party logs in by using the receiving party account and a browser provided with an inter-screen transmission entrance and is online. If yes, perform block S407; otherwise, perform block S409.

Herein, "online" refers to "the browser has already been logged in to". Regardless of whether the browser is currently open, as long as the browser is logged in to and is not logged out of, the browser is online (by default, when a browser is logged in to, "automatically log in during next start" is checked, and therefore, as long as a user does not log out actively or in the case in which a login state is invalid because the browser has not been used for a long time does not occur, the browser is automatically logged in to each time the user starts the browser).

Figure 3:
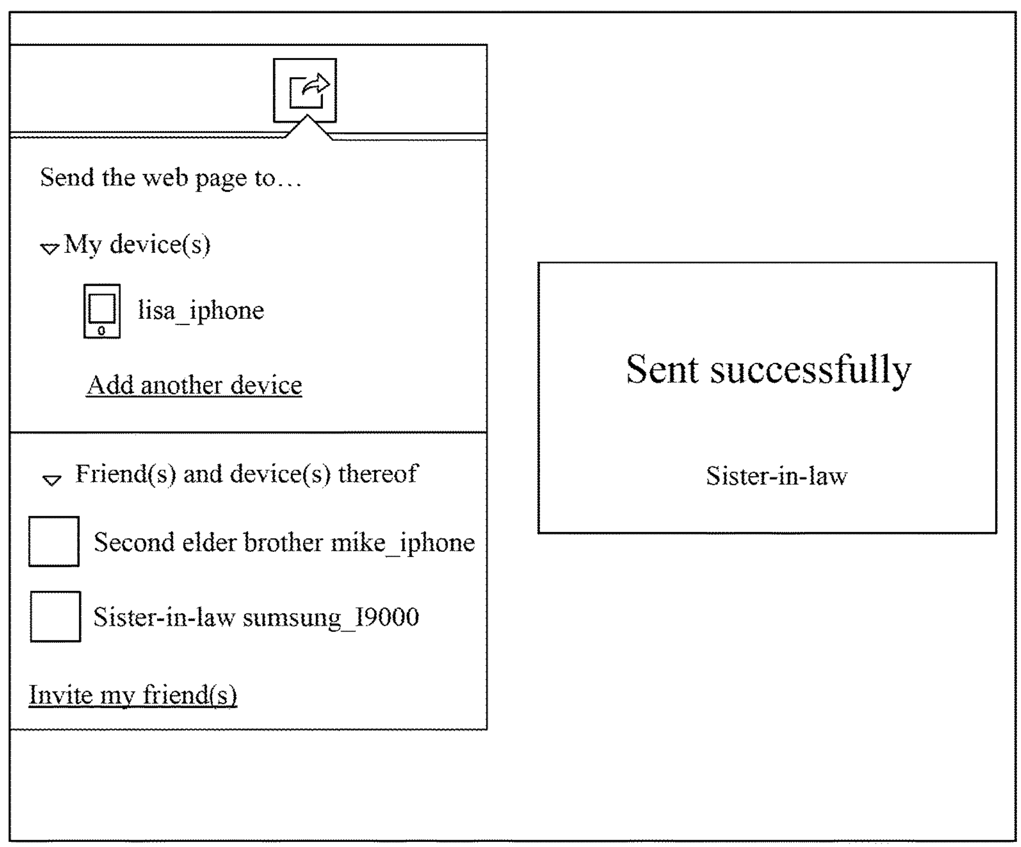

Block S407: The web server sends web page sharing information including the link address to a receiving party browser. After the information is successfully sent, a prompt of "sent successfully" may be displayed on the sending party browser, as shown in FIG. 3.

Block S408: The receiving party browser displays the web page sharing information to prompt a user whether to choose to share the web page or ignore sharing, accesses the corresponding web page by using the link address if the user chooses to share the web page, and block S410 is performed, or, the receiving party browser ends the display of the web page sharing information if the user chooses to ignore sharing.

Block S409: The web server sends, to the sending party browser, a response indicating the receiving party has not logged in to prompt the sending party to initiate an invitation and block S410 is performed.

Figure 4:
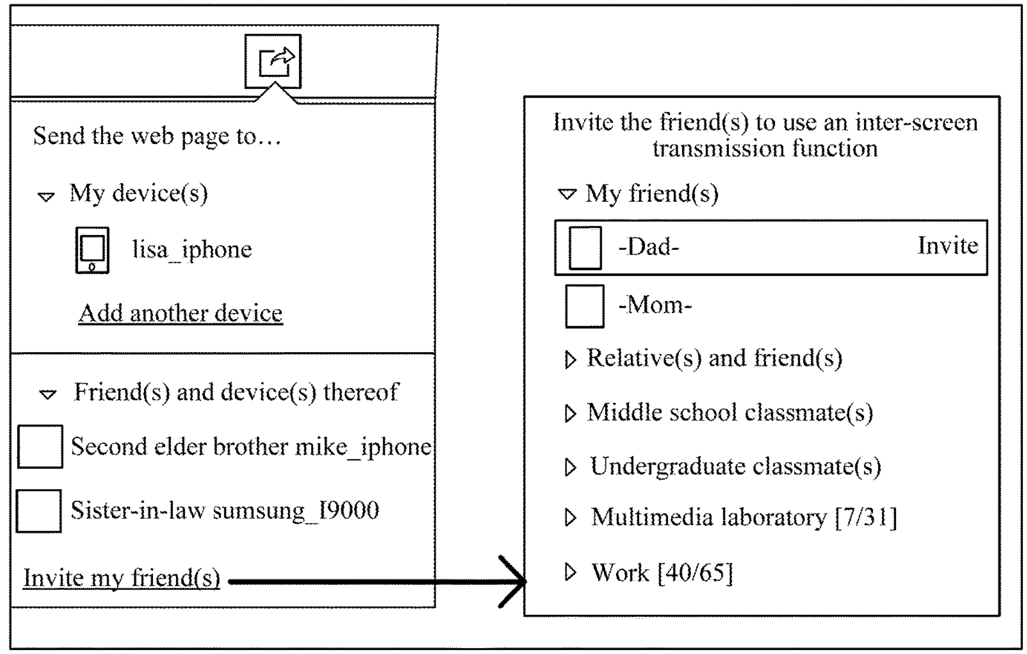
FIG. 4 is a diagram of a browser interface for transmitting browser web page information according to various embodiments.

Block S410: The sending party browser receives an invitation request that is input by the user by operating an invitation option, where the invitation request includes the sending party account and a friend associated account, and sends the invitation request to the web server. When the invitation is triggered, an invited object may further be selected from the friend list. As shown in FIG. 4, after an option "invite my friend(s)" is selected, an object is selected from friends displayed on the right side, and the invitation request is sent.

Block S411: The web server sends the invitation request to a network service server corresponding to the friend associated account.

Figure 5:
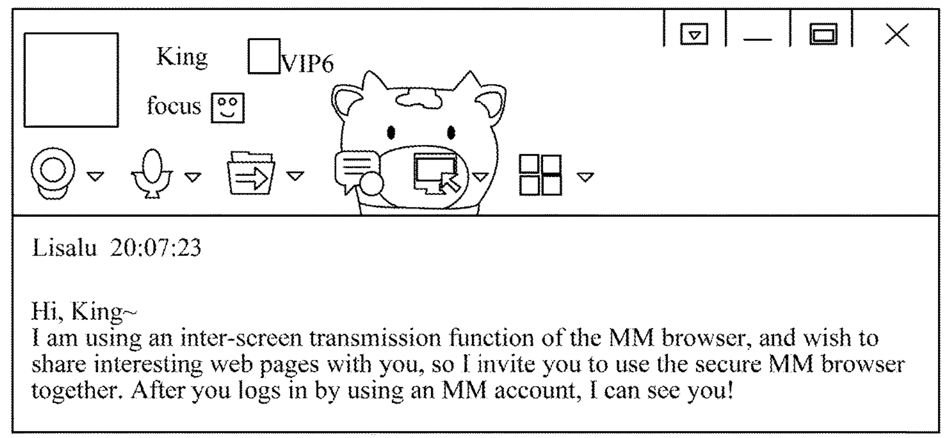
FIG. 5 is a diagram of invitation information according to various embodiments.

Block S412: The network service server sends invitation information including the sending party account to a client corresponding to the friend associated account for display. In this example, it is assumed that the friend associated account is a Renren account, and correspondingly, the network service server is a Renren service server. In this block, the Renren service server sends the invitation information including the sending party account to a client that corresponds to a Renren account of a friend for display, and the displayed invitation information is shown in FIG. 5.

The receiving party downloads and installs, or has already installed, a browser. After the receiving party successfully logs in by using an account, an inter-screen transmission function can be used.

By using the methods of the present disclosure, a shared web page can be directly sent to a browser of a friend and the friend can view the web page directly, and it is convenient to perform a subsequent operation. For example, collecting the web page, sending the web page to another device of the friend for view, or forwarding the web page to another friend of the friend. If a user invites friends who have already used a browser but have not used an "inter-screen transmission" function to use the function, for a browse product, it is an effective manner to promote the "inter-screen transmission" function among friends of the user. In addition, if the user invites friends who have not used a browser to use the function, for a browse product, it is an effective manner to promote a "browser" and the "inter-screen transmission" function among the friends of the user.

Figure 6:
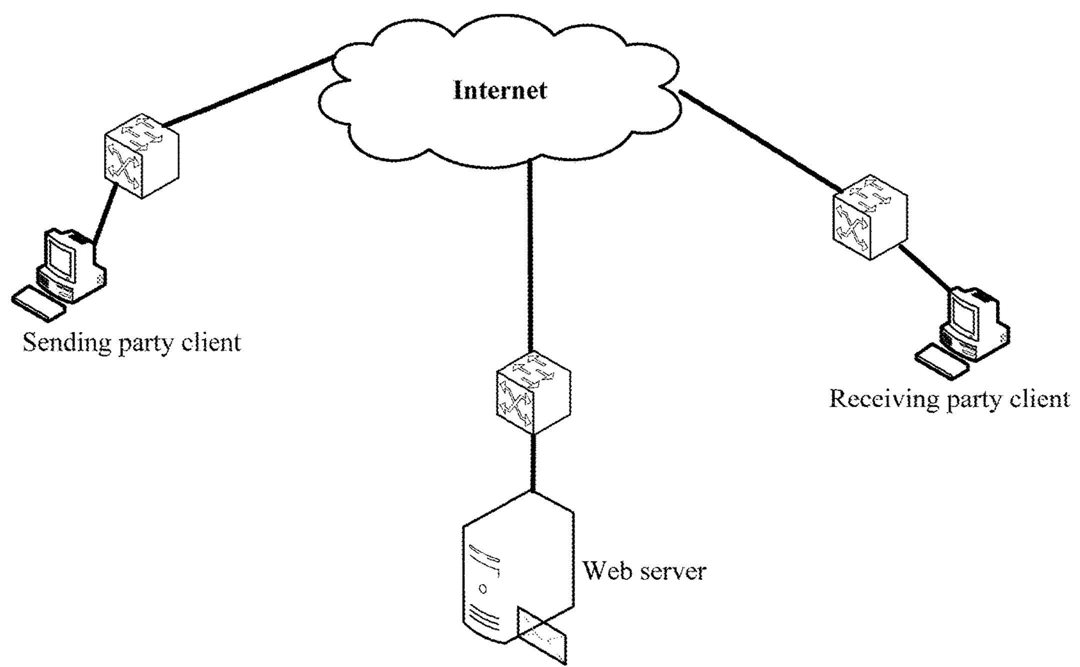
FIG. 6 is a block diagram of a system for transmitting browser web page information according to various embodiments.

FIG. 6 is a block diagram of an example of a system for transmitting browser web page information according to the present disclosure. The system includes a client at which a sending party browser is located, referred to as a sending party client, a client at which a receiving party browser is located, referred to as a receiving party client, and a web server. When web page information needs to be shared, the sending party browser of the sending party client sends a web page transmission request to the web server by means of the Internet. The web server determines that a receiving party logs in by using a receiving party account using a browser provided with an inter-screen transmission entrance, and is online, and sends, by means of the Internet, a link address to the receiving party browser corresponding to the receiving party account for web page access. The sending party browser sends the web page transmission request to the web server, where the web page transmission request includes the receiving party account and the link address, and the link address is a website address of a web page currently displayed by the sending party browser;

the web server receives the web page transmission request, determines that the receiving party logs in by using the receiving party account and a browser provided with an inter-screen transmission entrance, and is online, and sends the link address to the receiving party browser corresponding to the receiving party account for web page access; and the receiving party browser receives the link address from the web server, and accesses the corresponding web page.

Figure 7:
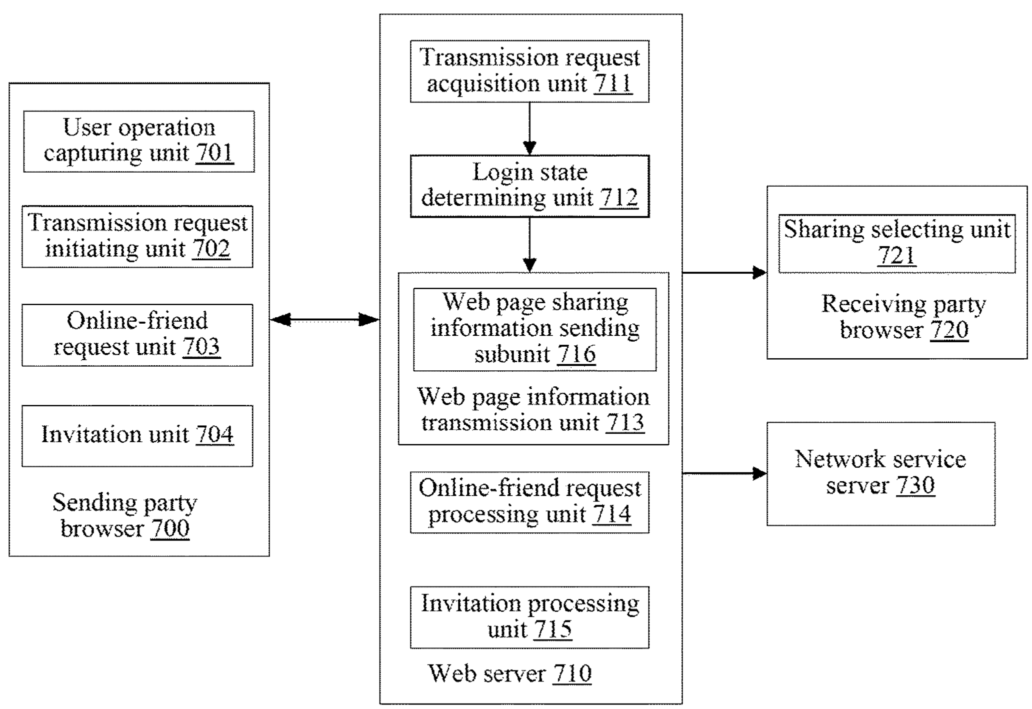
FIG. 7 is a block diagram of a system for transmitting browser web page information according to various embodiments.

Additionally, the sending party browser 700 includes a user operation capturing unit 701 and a transmission request initiating unit 702, and the web server 710 includes a transmission request acquisition unit 711, a login state determining unit 712, and a web page information transmission unit 713. FIG. 7 depicts a block diagram of the system of the present disclosure.

The user operation capturing unit 701 acquires a web page transmission request that is input by a user by operating a web page transmission option of an inter-screen transmission entrance, and sends the web page transmission request to the transmission request initiating unit 702;

the transmission request initiating unit 702 receives the web page transmission request from the user operation capturing unit 701, and sends the web page transmission request to the transmission request acquisition unit 711. The transmission request acquisition unit 711 receives the web page transmission request sent by the sending party browser 700, and sends the web page transmission request to the login state determining unit 712. The login state determining unit 712 receives the web page transmission request from the request acquisition unit 711, determines that the receiving party logs in by using the receiving party account and a browser provided with an inter-screen transmission entrance, and is online, and sends the web page transmission request to the web page information transmission unit 713. The web page information transmission unit 713 receives the web page transmission request from the login state determining unit 712, and sends the link address to the receiving party browser 720 corresponding to the receiving party account.

Further, the sending party browser 700 includes an online-friend request unit 703, and the web server 710 includes an online-friend request processing unit 714. The user operation capturing unit 701 acquires an online-friend list display request that is input by the user by operating an online-friend list display option, and sends the online-friend list display request to the online-friend request unit 703, where the online-friend list display request includes a sending party account. The online-friend request unit 703 receives the online-friend list display request from the user operation capturing unit 701, sends the online-friend list display request to the online-friend request processing unit 714, receives an online-friend list fed back by the online-friend request processing unit 714, and displays the online-friend list in an interface. The online-friend request processing unit 714 receives a friend list display request from the online-friend request unit 703, extracts a friend list corresponding to the sending party account, selects, from the friend list, an online friend logging in by using a browser provided with an inter-screen transmission entrance to generate the online-friend list, and feeds back the online-friend list to the online-friend request unit 703

Further, the web page information transmission unit 713 includes a web page sharing information sending subunit 716, and the receiving party browser 720 includes a sharing selecting unit 721. The web page sharing information sending subunit 716 receives the web page transmission request from the login state determining unit 712, and sends web page sharing information including the link address to the receiving party browser 720 corresponding to the receiving party account. The sharing selecting unit 721 of the receiving party browser 720 receives the web page sharing information from the web page sharing information sending subunit 716, displays the web page sharing information, to prompt a user whether to choose to share the web page or ignore sharing, and accesses the corresponding web page by using the link address if the user chooses to share the web page, or ends the display of the web page sharing information if the user chooses to ignore sharing.

Further, the sending party browser 700 includes an invitation unit 704, the web server 710 includes an invitation processing unit 715, and the system further includes a web page service server 730. The user operation capturing unit 701 acquires an invitation request that is input by the user by operating an invitation option, and sends the invitation request to the invitation unit 704, where the invitation request includes the sending party account and a friend associated account; and the invitation unit 704 receives the invitation request from the user operation capturing unit 701, and sends the invitation request to the invitation processing unit 715. The invitation processing unit 715 receives the invitation request from the invitation unit 704, and sends the invitation request to a network service server 730 corresponding to the friend associated account. The network service server 730 receives the invitation request from the invitation processing unit 715, and sends invitation information including the sending party account to a client corresponding to the friend associated account for display.

The foregoing descriptions are various embodiments of the present disclosure, but are not intended to limit the present disclosure. Any modification, equivalent replacement, or improvement made within the spirit and principle of the present disclosure shall fall within the protection scope of the present disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A method for transmitting browser web page information, comprising:

receiving, by a web server, a web page transmission request from a sending party browser running on a first computing device, the web page transmission request including an account of a receiving party and a link address, wherein the link address is a website address of a web page currently displayed by the sending party browser;

determining, by the web server, whether the web server has stored therein a record indicating a type of receiving party browser provided with an inter-screen transmission entrance and that the receiving party is online due to the receiving party having logged into the account of the receiving party using the receiving party browser and has not logged out of the account of the receiving party, regardless of whether the receiving party browser is currently open on a second computing device associated with the receiving party; and sending, by the web server, the link address to the receiving party browser.

2. The method according to claim 1, wherein the method further comprises:

receiving, by the sending party browser, a friend list display request that is input by a user by operating a friend list display option, and sending the friend list display request comprising a sending party account to the web server;

extracting, by the web server, a friend list corresponding to the sending party account, and feeding back the friend list to the sending party browser; and displaying, by the sending party browser, the friend list in an interface.

3. The method according to claim 1, wherein the method further comprises:

receiving, by the sending party browser, an online-friend list display request that is input by a user by operating an online-friend list display option, and sending the online-friend list display request comprising a sending party account to the web server;

extracting, by the web server, a friend list corresponding to the sending party account;

selecting, by the web server from the friend list, an online friend logging in by using a browser provided with an inter-screen transmission entrance, to generate an online-friend list, and feeding back the online-friend list to the sending party browser; and displaying, by the sending party browser, the online-friend list in an interface.

4. The method according to claim 1, wherein the sending, by the web server, the link address to a receiving party browser corresponding to the receiving party account for web page access comprises:

sending, by the web server, web page sharing information comprising the link address to the receiving party browser; and displaying, by the receiving party browser, the web page sharing information, to prompt a user whether to choose to share a web page or ignore sharing, and accessing a corresponding web page by using the link address if the user chooses to share the web page, or ending the display of the web page sharing information if the user chooses to ignore sharing.

5. The method according to claim 1, wherein the method further comprises:

receiving, by the sending party browser, an invitation request that is input by a user by operating an invitation option, wherein the invitation request comprises a sending party account and a friend associated account, and sending the invitation request to the web server;

sending, by the web server, the invitation request to a network service server corresponding to the friend associated account; and sending, by the network service server, invitation information comprising the sending party account to a client corresponding to the friend associated account for display.

6. A web server for transmitting browser web page information, comprising:

one or more processors;

memory storing instruction units which comprising:

a request acquisition unit, a login state determining unit, and a web page information transmission unit;

the request acquisition unit receiving a web page transmission request from a sending party browser running on a first computing device, the web page transmission request including an account of a receiving party and a link address, wherein the link address is a website address of a web page currently displayed by the sending party browser;

the login state determining unit receiving the web page transmission request from the request acquisition unit, determining whether the web server has stored therein a record indicating a type of receiving party browser provided with an inter-screen transmission entrance and that the receiving party is online due to the receiving party having logged into the account of the receiving party using the receiving party browser and has not logged out of the account of the receiving party, regardless of whether the receiving party browser is currently open on a second computing device associated with the receiving party, and sending the web page transmission request to the web page information transmission unit; and the web page information transmission unit receiving the web page transmission request from the login state determining unit, and sending the link address receiving party browser.

7. The web server according to claim 6, wherein the web server further comprises an online-friend request processing unit, configured to receive a friend list display request from the sending party browser, extract a friend list corresponding to a sending party account, select, from the friend list, an online friend logging in by using a browser provided with an inter-screen transmission entrance, to generate an online-friend list, and feed back the online-friend list to the sending party browser.

8. The web server according to claim 6, wherein the web page information transmission unit comprises a web page sharing information sending subunit; and the web page sharing information sending subunit receives the web page transmission request from the login state determining unit, and sends web page sharing information comprising the link address to the receiving party browser corresponding to the receiving party account.

9. The web server according to claim 6, wherein the web server comprises an invitation processing unit; and the invitation processing unit receives an invitation request from the sending party browser, wherein the invitation request comprises a sending party account and a friend associated account, and sends the invitation request to a network service server corresponding to the friend associated account, so as to send invitation information comprising the sending party account to a client corresponding to the friend associated account for display.

10. A method comprising:

acquiring, by a user operation capturing unit, a web page transmission request that is input by a user by operating a web page transmission option of an inter-screen transmission entrance, and sending the web page transmission request to a transmission request initiating unit, the web page transmission request including an account of a receiving party and a link address, wherein the link address is a website address of a web page currently displayed by a sending party browser;

receiving, by the transmission request initiating unit, the web page transmission request from the user operation capturing unit, and sending the web page transmission request to a web server;

determining, by the web server, whether the web server has stored therein a record indicating a type of receiving party browser provided with an inter-screen transmission entrance and that the receiving party is online due to the receiving party having logged into the account of the receiving party using the receiving party browser and has not logged out of the account of the receiving party, regardless of whether the receiving party browser is currently open on a second computing device associated with the receiving party; and sending, by the web server, the link address to the receiving party browser.

11. The method according to claim 10, wherein the sending party browser comprises an online-friend request unit, wherein the method further comprises:

acquiring, by the user operation capturing unit, an online-friend list display request that is input by the user by operating an online-friend list display option, and sending the online-friend list display request to the online-friend request unit, wherein the online-friend list display request comprises a sending party account; and receiving, by the online-friend request unit, the online-friend list display request from the user operation capturing unit, sending the online-friend list display request to the web server, receiving an online-friend list fed back by the web server, and displaying the online-friend list in an interface.

12. The method according to claim 10, wherein the sending party browser further comprises an invitation unit, wherein the method further comprises:

acquiring, by the user operation capturing unit, an invitation request that is input by the user by operating an invitation option, and sending the invitation request to the invitation unit, wherein the invitation request comprises a sending party account and a friend associated account; and receiving, by the invitation unit, the invitation request from the user operation capturing unit, and sending the invitation request to the web server.

* * * * *